No. 676,416. Patented June 18, 1901.
S. F. BURTON.
GARDEN TOOL.
(Application filed Dec. 3, 1900.)
(No Model.)

Witnesses
Harry S. Rohrer
F. C. McCleary

Inventor:
Samuel F. Burton
By Victor J. Evans Attorney

UNITED STATES PATENT OFFICE.

SAMUEL F. BURTON, OF FORSYTH, MONTANA.

GARDEN-TOOL.

SPECIFICATION forming part of Letters Patent No. 676,416, dated June 18, 1901.

Application filed December 3, 1900. Serial No. 38,599. (No model.)

*To all whom it may concern:*

Be it known that I, SAMUEL F. BURTON, a citizen of the United States, residing at Forsyth, in the county of Custer and State of Montana, have invented new and useful Improvements in Garden-Tools, of which the following is a specification.

My invention relates to combination garden-tools and means for removably securing a handle to such implements.

The construction of the improvement will be fully described hereinafter in connection with the accompanying drawings, which form a part of this specification, and its novel features will be defined in the appended claims.

Figure 1:
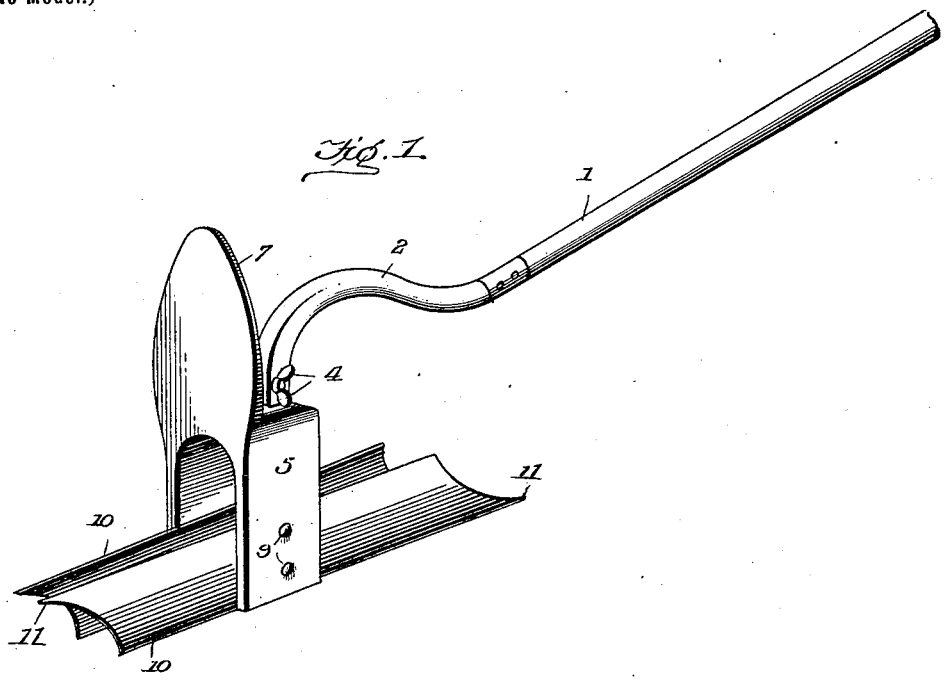
Figure 2:
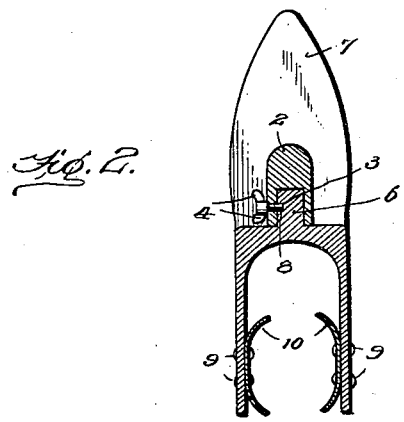

In the drawings, Figure 1 is a view in perspective of a combination garden-tool embodying the invention. Fig. 2 is a vertical section of the same.

The reference-numeral 1 designates the tool-handle, and 2 the socket thereof, bent downward at its outer end and formed with a side opening to receive a set-screw 3, preferably provided with wings 4.

The tool shown in the drawings comprises an inverted-U-shaped frame 5, having a projecting tang 6 and an integral hoe or digger 7. The tang 6 is formed at one side with a slot or recess 8, adapted to register with the opening in the socket 2 to receive the inner end of the set-screw 3. To the inner surface of each of the depending sides of the frame 5 is secured by rivets or bolts 9 a blade or coverer 10, curved in cross-section to concavo-convex form and preferably hollowed out at its ends to form sharpened projections 11. These blades 10 are oppositely disposed, as clearly shown in the drawings, and designed as coverers in planting seeds.

I claim—

1. A garden implement comprising an inverted-U-shaped frame having a projecting tang, and a projecting hoe-blade, in combination with curved blades secured to the inner surfaces of said frame; a handle-socket to receive said tang, and means for securing the tang to the socket.

2. A garden implement comprising an inverted-U-shaped frame having a slotted tang, and a projecting hoe-blade, in combination with curved blades secured to the inner surfaces of the sides of said frame, a handle-socket adapted to receive said tang, and a set-screw passing through an opening in the socket and into the slot in the tang.

In testimony whereof I affix my signature in presence of two witnesses.

SAMUEL F. BURTON.

Witnesses:
 CHARLES BALL,
 C. S. BANTA.